INVENTOR
CLAUDE C. ANKENY

Oct. 10, 1967   C. C. ANKENY   3,346,830
HIGH RESOLUTION PRESSURE TRANSDUCER
Filed Jan. 21, 1966   2 Sheets-Sheet 2

INVENTOR
CLAUDE C. ANKENY

ATTORNEYS

United States Patent Office 3,346,830
Patented Oct. 10, 1967

3,346,830
HIGH RESOLUTION PRESSURE TRANSDUCER
Claude C. Ankeny, Sandoval, N. Mex., assignor to Sparton Corporation, Jackson, Mich., a corporation of Ohio
Filed Jan. 21, 1966, Ser. No. 522,140
2 Claims. (Cl. 338—40)

ABSTRACT OF THE DISCLOSURE

A high resolution pressure to electric transducer employing a longitudinally twisted Bourdon tube pressure summing means, in combination with a novel rotary motion amplifying assembly coupling said Bourdon tube to a radially driven wiper arm of a potentiometer output means.

---

This invention relates to a pressure measuring system, and more particularly to an electrical-mechanical transducer which produces an electrical output signal of a magnitude in proportion to a physical condition such as a force or pressure, or other such physical conditions that can be expressed in terms of a pressure.

A typical transducer system includes an assembly by which energy from one power system is converted to another system. Typically, pressure transducer systems translate a pressure differential into a voltage, current, resistance, or inductance, or variations of these values, as a function of the applied pressure.

Presently, many modern transducer systems employ piezoelectric elements for converting mechanical forces such as pressures and accelerations into electrical signals. Such transducers are also employable for detecting and measuring variable forces applied to the transducer. Still other types of transducers include systems in which a force summing means varies the amount of light impinging upon photoelectric sensors, and still other transducers employ diaphragm capsules for low pressure measurements. For higher pressure measurements Bourdon tubes of various shapes, construction and compositions are commonly used. Fused quartz is also utilized in Bourdon tubes particularly where hysteresis is a problem and where metal fatigue or creep is intolerable.

For ease of measurement its has been found desirable to convert pressures to electrical signals. It is also desirable that the system for converting the force or the pressure to an electrical signal be small, compact, rugged, and be also capable of measuring accurately a relatively large range of pressures. The demands of the aerospace industry have provided a new order of requirements and design sophistication which has been heretofore unknown in the pressure to electric transducer industry.

In the pressure measuring system of the instant invention, there is provided an improvement over prior art designs, and inherent in its design is a novel transducer more simple than prior art devices. It is characterized further by being dynamically balanced and of mechanically sophisticated design; it is operable over wide temperature ranges, vibration and shock, and is an extremely accurate instrument, yet inexpensive to manufacture.

Prior art transducers typically translate linear motion into rotary motion. This translation of linear motion into rotational motion requires complicated drive mechanisms or electronic detection circuitry and such previous designs are characterized further by poor resolution, instrument calibration difficulties, and are also inefficient in design and expensive to manufacture. Previous transducer designs also require force amplifying assemblies, which are inherently larger in overall dimensions.

The instant design employs a high precision twisted, sometimes referred to as a torsional, straight-line Bourdon tube as the force summing element. One end of this tube rotates about its central axis in response to pressure changes to provide a primary rotary motion which is transmitted directly to a simple mechanical amplification system which provides for a linearized potentiometric output. The compactness of the instant novel design, coupled with its accuracy and suitability for aerospace environments, without resorting to the use of complicated electronic circuitry or large mechanical amplification system, efficiently overcomes the inadequacies of prior art transducer systems.

Accordingly, it is a primary object of this invention to overcome the foregoing limitations and to provide a miniature transducer which accurately converts, under severe environmental conditions, a physical force to an electrical signal, and in particular which provides for precise electrical outputs resulting from the simple, unique, rotary motion sensing, transmission and amplification mechanism produced through the untwisting of a Bourdon tube as a function of input pressure signals.

It is a further object of the present invention to provide a novel transducer system for accurately measuring pressures, pressure differentials, or any other physical condition that can be expressed in terms of a pressure.

Another object of the instant invention is to provide a pressure to electric transducer having a displacement member which is operational over widely varying temperature and pressure conditions, and which is operational under severe shock and vibrational conditions.

A particular object of the invention is to provide a high performance, miniature, compact, high resolution, transducer system which employs a twisted Bourdon tube as the force summing member, and which provides for an electrical output without the use of large mechanical amplification systems, or complicated electronic circuitry.

Another particular object of the instant invention is to provide an inexpensive, rugged, miniaturized pressure measuring system which is characterized by high accuracy and ease of calibration.

The high resolution pressure to electric transducer system of this invention and its high compact manner of construction, assembly, and its use, can be more clearly understood from the following detailed description, taken in conjunction with the accompanying drawings, in which.

Figure 1:
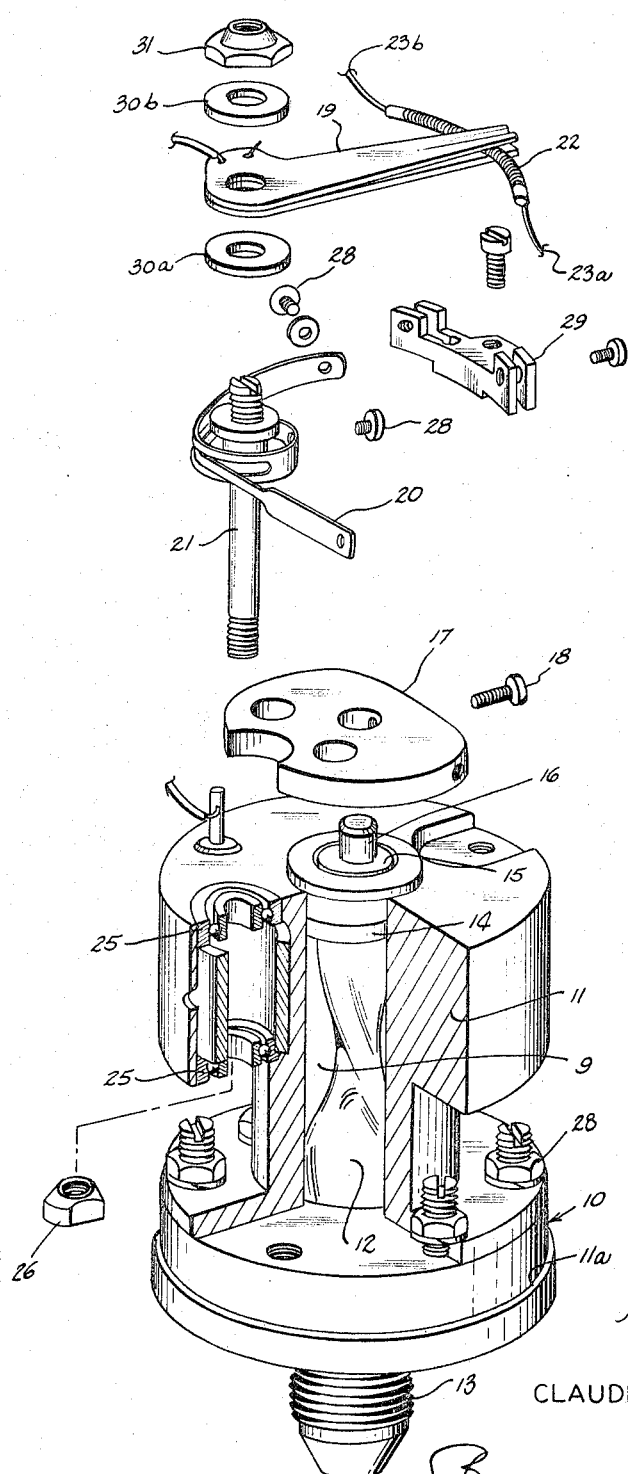
FIGURE 1 is an exploded view having a cross sectional portion illustrating the preferred transducer embodiment of this invention.

Referring now to the drawings, in which like reference numerals denote like elements in all drawings hereof, the preferred embodiment of the instant invention as shown in FIG. 1, is a transducer generally indicated at 10 having a housing 11 defining a cavity 9 which partially encloses a twisted Bourdon tube 12 which is partially enclosed by and fixed at threaded tubular male coupling member 13, wherein is provided an opening for pressure inlet. Transducer 10 is threaded into the wall of a pressure source so as to provide for direct communication thereto. Variations in pressure, which constitute an input signal, are admitted to the pressure responsive assembly through threaded end portion 13 and into the Bourdon tube 12 to communicate with the internal portions thereof, causing the opposed tube free end to move rotatably within seal 14 and on bearings 15, and to cause a torque through shaft 16 to be transmitted to large diameter disk 17, being mounted to the shaft 16 by screw 18. It is thereby seen that tube 12 twists along its longitudinal axis in response to pressure input signals arriving through an opening located near 13, causing disk 17 to rotate and transmit rotary drive motion to wiper arm 19 through a taut thin metallic band 20 which encircles a smaller diameter rotatable shaft 21 causing radial arc amplified shaft 21 movement in an amount proportional to the effective lengths of respective band 20, portions secured to amplified disk 17 and the shaft 21, with said shaft being directly connected to wiper arm 19. This unique amplification and drive mechanism combination enables the direct transmission of Bourdon tube rotational movement through amplified shaft 21 movement into wiper arm rotational movement, thereby providing for enhanced accuracy and resolution of potentiometric outputs at 23a and 23b through resistance member 22.

Figure 2:
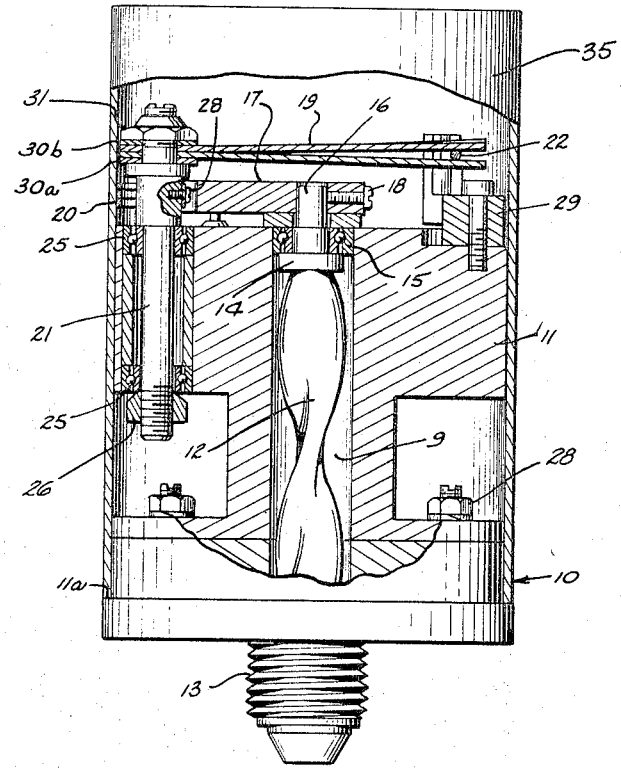
FIGURE 2 is a view of the instant transducer taken along lines II—II of FIGURE 3 partially cut away.
Figure 3:
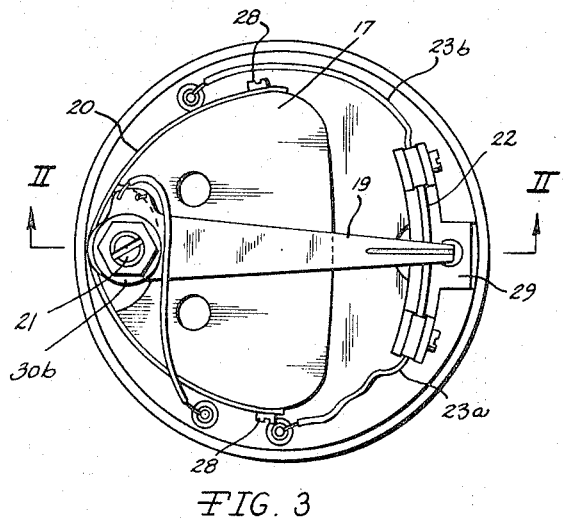
FIGURE 3 is an end view having the cover portion removed to expose the potentiometric assembly; to expose the wiper movement mechanism and its means of attachment; and illustrates further the novel flexure band amplification mechanism and its method of attachment.

Resistance member 22, as illustrated in FIGURE 1, FIGURE 2, and FIGURE 3, is a platinum alloy wire of 0.5 to 2 mils thickness, being wound 400 to 800 turns around a dielectric mandrel, which can be suitably a ceramic, phenolic, micarta, or other material being selected to match the temperature coefficients of wire expansion. In a preferred embodiment, 600 turns of platinum wire is emloyed and wound around a phenolic mandrel.

The resistant element 22 can be desirably a conductive plastic to improve resolution and to provide for a low sliding coefficient of friction between wiper arm 19. A low coefficient of expansion provides for increased wiper pressure which minimizes spurious output signals due to wiper arm lift-off in vibrational or shock conditions. The conductive plastic resistance element 22 is further characterized by longer operating life. It may also be desirable to employ a deposited or chemically treated metallic film for use as the resistance material over the insulating mandrel, and commutation patterns and conducting paths for circuit development being additionally provided by metallic film deposition to achieve direct electrical functionality within the transducer element housing. Another aspect of the invention is the providing of active and passive microcircuit elements disposed within a cover portion 35, with the cover being a rigid metal can type or tubular covering which fits over the assembly including the potentiometer and its drive mechanism to completely encapsulate the exposed portions thereof, said can sealing to the two-section housing member 11 at shoulder portion 11a. A miniaturized power source or battery may also be provided within the can member to provide for a completely contained pressure to electric transducer element.

The hollow twisted Bourdon tube 12 is of precise design and is desirably manufactured of a corrosion resistant metal which also exhibits small hysteresis error, temperature sensitivity, and vibrational insensitivity, such as commercial alloy Ni-Span C, or other suitable material such as copper based alloys, stainless steels and nickel based alloys. The tube 12 is designed to rotate freely at the end opposed to inlet portion generally located at 13 within the housing cavity. This arrangement thereby provides for direct rotational transmission of torque to amplified rotational movement of wiper arm 19, which is a double wiping surface arm illustrated conveniently in FIG. 1 and composed of multi-layers of thin gauge metal bound into a composite structure to shaft 21 through washers 30a, 30b and nut 31, to provide for a high damping poteniometer contact member. The resistant element 22 is mounted to housing 11 through support 29 which contacts element 22 only at the end thereof, thereby providing for full arm 19 travel over the entire surface thereof.

Resistance element 22 is provided with a curvature based on employing the wiper arm 19 pivot center line at 21 as the radius point. The curved resistance element 22 working in cooperation through radially movable wiper arm 19 with small concentric diameter member shaft 21, through flexure band 20 is tangentially secured to and driven by large diameter disk 17, said driving mechanism accurately calibrated with a substantially linear electrical output which is in proportion to the pressure signal input, also providing for increased angular travel of shaft 21 through the amplifying mechanism and rotary transfer means, and providing further a transducer of extremely high resolution. An inherent feature within this dynamically balanced, direct rotational movement transfer mechanism and amplifying drive design is ease of transducer calibration to within 0.1% of the pressure element characteristics, which has been heretofore unobtainable in this kind of transducer.

To secure enhanced vibrational and shock resistance, the wiper arm 19 provides for positive contact pressures over resistant element 22 thereby minimizing noise spikes and spurious output signals. Noise is further minimized by providing a wiper configuration having protrusions resonating at different frequencies and by providing multi-layered composite structures with like damping features wherein the individual metallic layers resonate at a different natural frequency.

The cavity 9 provided within body 10 is suitably evacuated to provide for the measurement of absolute pressures. If desired, ports may be provided in the walls of cavity 9 whereby fluid or other pressure inducing means may be in communication with the external portion of twisted tube 12 thereby providing for a differential pressure transducer.

FIGURE 2 shows the placement of precision ball bearings 25 rotatably confining driving shaft 21, secured to housing 11 by nuts 26. Nuts 28 provide for mounting of the housing 11 onto the supporting member which becomes an interval portion thereof, and which further provides for mechanical assembly ease. FIGURE 3 illustrates the long active pot length desirably provided by mounting resistance element at the ends thereof. FIGURE 3 also illustrates the curved configuration of element 22 in relation to the radial arm cooperating movement of wiper 19, and the simple method of attaching the stainless steel flexure band 20 with screws 28 to the driving plate 17.

It may also be desirable to incorporate within the transducer housing and assembly to thereby provide a hermetically sealed package which includes active and passive microcircuit electronic elements to amplify, digitize, or otherwise provide for the desired system electrical output. Such an enclosure can desirably include miniaturized battery means.

The active and passive elements may be conveniently in functional electronic blocks, such as integrated semiconductor networks and hybrid microcircuitry thus providing for a totally enclosed pressure to electric transducer system. The advantages of such a self-contained functional system with its low power requirements, and inherent accuracy and simplicity, as well as its size, make it particularly useful in space and aerospace environments.

It is therefore obvious to one skilled in the art that various modifications of the inventive concept can be made without departing from the basic invention hereof, and it may also be seen that the objects set forth hereinabove, among those made apparent from the detailed drawings and description hereof, are efficiently realized, and since certain changes may be made in the above constructions without departing from the concept and scope hereof, it is intended therefore that all matter contained in the afore drawings and description shall be interpreted as illustrative, and not in a limiting sense, and is to be limited only by the appended claims.

Having thus described my invention, I claim:

1. A precision, miniature pressure-to-electric transducer comprising, in combination,
    (a) electrical input means,
    (b) housing means defining a cavity, (c) pressure summing means disposed within said cavity and in direct communication with pressure input signals,
(d) said pressure summing means being a Bourdon tube twisted about its longitudinal axis and having a fixed end at the pressure inlet portion thereof and an opposed movable end,
(e) multiple mechanical means directly transferring pressure summing means end movement into amplified rotary motion,
(f) potentiometer means having the wiper arm thereof radially driven by said amplifier rotary motion multiple mechanical means, and
(g) container seal means to provide for a completely encapsulated functional transducer.

2. A high precision pressure-to-electric transducer comprising, in combination,
(a) electrical input means,
(b) support means defining a cavity,
(c) housing means secured to said support means and further extending said cavity,
(d) a Bourdon tube twisted about its longitudinal axis providing a pressure summing means disposed within said cavity,
(e) said Bourdon tube having a rotatably movable end and an opposed end fixed to said support means,
(f) rotary motion responsive means coupled to said Bourdon tube,
    said rotary motion responsive means having a first shaft secured to said Bourdon tube at the rotatably movable end thereof,
    a semi circular large diameter disc fixed to said first shaft and adapted to rotate thereabout,
    a second small diameter shaft member rotatably mounted within said housing and adapted to transmit radial wiper arm motion to a potentiometric resistor assembly fixed to said housing,
    a flexure band tangentially secured to said disc and extending with looped configuration about said small diameter shaft member and connected thereto and adapted to drive said shaft with amplified rotary motion in response to disc angular displacement,
(g) electrical output means, and
(h) encapsulation means to provide for a totally sealed transducer.

References Cited
UNITED STATES PATENTS

| | | | |
|---|---|---|---|
| 2,497,974 | 2/1950 | Bourns | 338—40 |
| 2,751,576 | 6/1956 | Soergel et al. | 340—187 |
| 2,788,665 | 4/1957 | Wiancko | 73—411 |
| 2,846,550 | 8/1958 | Boddy | 338—40 |
| 2,877,326 | 3/1959 | Bourns | 338—40 |
| 2,956,251 | 10/1960 | Goeppinger et al. | 338—40 |
| 2,976,506 | 3/1961 | Bourns | 338—40 |
| 3,126,519 | 3/1964 | Burley | 338—40 |
| 3,145,359 | 8/1964 | Parkinson | 338—40 |
| 3,160,014 | 12/1964 | De Julio et al. | 73—398 |
| 3,289,136 | 11/1966 | Marks et al. | 338—42 |

RICHARD M. WOOD, *Primary Examiner.*

W. D. BROOKS, *Assistant Examiner.*